United States Patent
Kallaway

(10) Patent No.: US 9,727,057 B2
(45) Date of Patent: Aug. 8, 2017

(54) VESSEL POSITIONING SYSTEM FOR MAINTAINING RELATIVE POSITION BETWEEN VESSELS OPERATIVELY COUPLED AND METHOD

(71) Applicant: CONOCOPHILLIPS COMPANY, Houston, TX (US)

(72) Inventor: Kristian Robert Kallaway, Spring, TX (US)

(73) Assignee: ConocoPhillips Company, Houston, TX (US)

( * ) Notice: Subject to any disclaimer, the term of this patent is extended or adjusted under 35 U.S.C. 154(b) by 122 days.

(21) Appl. No.: 14/575,319

(22) Filed: Dec. 18, 2014

(65) Prior Publication Data

US 2015/0198950 A1     Jul. 16, 2015

Related U.S. Application Data

(60) Provisional application No. 61/927,123, filed on Jan. 14, 2014.

(51) Int. Cl.
| | |
|---|---|
| *B63J 99/00* | (2009.01) |
| *G05D 1/02* | (2006.01) |
| *B63B 27/34* | (2006.01) |
| *B63H 25/42* | (2006.01) |
| *B63B 21/50* | (2006.01) |

(52) U.S. Cl.
CPC ........... *G05D 1/0206* (2013.01); *B63B 27/34* (2013.01); *B63H 25/42* (2013.01); *B63B 21/507* (2013.01); *B63J 99/00* (2013.01); *B63J 2099/006* (2013.01)

(58) Field of Classification Search
None
See application file for complete search history.

(56) References Cited

U.S. PATENT DOCUMENTS

| | | |
|---|---|---|
| 2003/0061980 A1 | 4/2003 | Cottrell et al. |
| 2004/0106339 A1* | 6/2004 | Breivik ................. B63B 27/24 441/4 |

(Continued)

FOREIGN PATENT DOCUMENTS

GB     2189911     11/1987

OTHER PUBLICATIONS

International Search Report. PCT/US 14/71240 Dated Mar. 11, 2015.

*Primary Examiner* — John R Olszewski
*Assistant Examiner* — James M McPherson
(74) *Attorney, Agent, or Firm* — ConocoPhillips Company

(57) ABSTRACT

A method of maintaining positioning between vessels includes monitoring a relative position between a storage tank vessel and a shuttle tanker with a control system in operative communication with the vessels. Also included is inputting physical property data relating to the storage tank vessel and the shuttle tanker to the control system. Further included is processing environmental condition data with the control system. Yet further included is controlling at least one positioning action to be taken by the storage tank vessel and the shuttle tanker with the control system in response to positioning calculations conducted by the control system based on the physical property data and the environmental condition data. Also included is maintaining an angular differential within a predetermined limit with the at least one positioning action.

10 Claims, 4 Drawing Sheets

(56) References Cited

U.S. PATENT DOCUMENTS

| | | | |
|---|---|---|---|
| 2005/0002739 A1 | 1/2005 | De Baan | |
| 2008/0242165 A1 | 10/2008 | Adkins et al. | |
| 2012/0037240 A1* | 2/2012 | Adkins | B63B 22/026 137/15.09 |
| 2012/0128449 A1* | 5/2012 | Fikes | B63B 27/25 414/137.9 |
| 2015/0291267 A1* | 10/2015 | Khachaturian | B63C 7/04 701/21 |

* cited by examiner

VESSEL POSITIONING SYSTEM FOR MAINTAINING RELATIVE POSITION BETWEEN VESSELS OPERATIVELY COUPLED AND METHOD

CROSS-REFERENCE TO RELATED APPLICATIONS

This application claims benefit of U.S. Patent Application Ser. No. 61/927,123 filed Jan. 14, 2014, entitled "VESSEL POSITIONING SYSTEM FOR MAINTAINING RELATIVE POSITION BETWEEN VESSELS OPERATIVELY COUPLED AND METHOD," which is hereby incorporated by reference.

FIELD OF THE INVENTION

This invention relates to a vessel positioning system for maintaining a desired relative position between vessels and, more particularly, to an offshore fluid storage and offload system, as well as a method of maintaining positioning between vessels.

BACKGROUND OF THE INVENTION

One factor in determining whether or not to exploit an offshore oil and gas field is the feasibility of handling and transporting the hydrocarbons to market once they are produced. Generally, hydrocarbons produced offshore must be transported to land-based facilities for subsequent processing and distribution. Temporary storage may be provided at the offshore production site for holding limited quantities of hydrocarbons produced and awaiting transport to shore. In some cases, equipment is also provided at the offshore production site for separating and/or treating the produced hydrocarbons prior to storing and transporting them to shore.

In the case of an offshore production facility located relatively close to shore, hydrocarbons produced may be feasibly transported to shore through a pipeline system extending from the offshore site (e.g., offshore platform or subsea wells) to the shore along the ocean floor or seabed. This type of pipeline system is advantageous, when feasible, because it permits the constant flow of hydrocarbons to shore regardless of the weather or other adverse conditions. However, in some parts of the world, the use of a seabed pipeline system for transporting hydrocarbons to shore may be cost-prohibitive and/or impractical.

For offshore facilities located a great distance from shore, construction of a pipeline to shore is typically not practicable. In these cases, storage (and possibly production) vessels are used to store the hydrocarbons. The hydrocarbons are transported to shore by a shuttle tanker that is configured to receive the hydrocarbons from the storage vessel during an offload operation.

Because the storage vessel and the shuttle tanker both float on the water surface, their operations are largely dependent upon surface conditions, such as wind, wave, and current conditions. An offload operation that requires connection of an offload hose between the vessels is a complex operation in even benign conditions. As the conditions become more extreme, such an operation increases in complexity to the point that operations during severe or unfavorable conditions are often postponed, thereby leading to lost opportunity due to the downtime.

Current industry off-take solutions force tankers offloading from FPSO's to accept 100% of the movement about the FPSO, thereby limiting the operability window uptime. The current solutions in the market space include non-DP tankers with a Hawser connection to an FPSO, a DP tanker/Hawser combination connection to a FPSO, and a DP tanker to FPSO connection via only hoses. In all current industry solutions, the tanker systems are the sole solution for vessel control and off take acceptance.

SUMMARY OF THE INVENTION

In one embodiment of the invention, a method of maintaining positioning between vessels is provided. The method includes monitoring a relative position between a storage tank vessel and a shuttle tanker with a control system in operative communication with the storage tank vessel and the shuttle tanker, the storage tank vessel fixed about a storage tank vessel bow region and operatively coupled to the shuttle tanker with an offload hose extending from a storage tank vessel stern region to a shuttle tanker bow region. The method also includes inputting physical property data relating to the storage tank vessel and the shuttle tanker to the control system. The method further includes processing environmental condition data with the control system. The method yet further includes controlling at least one positioning action to be taken by the storage tank vessel and the shuttle tanker with the control system in response to positioning calculations conducted by the control system based on the physical property data and the environmental condition data. The method also includes maintaining an angular differential within a predetermined limit with the at least one positioning action.

In another embodiment of the invention, an offshore fluid storage and offload system includes a storage tank vessel configured to store hydrocarbons therein, the storage tank vessel fixed about a storage tank vessel bow region. Also included is a shuttle tanker configured to receive hydrocarbons from the storage tank vessel. Further included is at least one offload hose having a first end operatively coupled to a storage tank vessel stern region and a second end operatively coupled to a shuttle tanker bow region, at least one offload hose configured to transfer hydrocarbons from the storage tank vessel to the shuttle tanker. Yet further included is at least one storage tank vessel thruster configured to modify a storage tank vessel position. Also included is at least one shuttle tanker thruster configured to modify a shuttle tanker position. Further included is a control system configured to monitor an angular differential between the storage tank vessel and the shuttle tanker, the control system in operative communication with the storage tank vessel and the shuttle tanker to provide positioning actions to the storage tank vessel and the shuttle tanker, wherein control of the at least one storage tank vessel thruster with the storage tank vessel and the at least one shuttle tanker thruster with the shuttle tanker is configured to maintain the angular differential within a predetermined limit.

According to yet another embodiment of the invention, a vessel positioning system for maintaining relative position between vessels operatively coupled during an operation is provided. The vessel positioning system includes a first vessel and at least one first vessel thruster configured to modify a first vessel position. Also included is a second vessel operatively coupled to the first vessel and at least one second vessel thruster configured to modify a second vessel position. Further included is a control system in operative communication with the first vessel and the second vessel, the control system configured to monitor a relative position between the first vessel and the second vessel, the control system in operative communication with the first vessel and the second vessel to provide positioning actions based on the relative position of the vessels and environmental data received by the control system, wherein control of the at least one first vessel thruster with the first vessel and the at least one second vessel thruster with the second vessel is configured to maintain the relative position within a predetermined limit.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made without departing from the scope or spirit of the invention. For instance, features illustrated or described as part of one embodiment can be used on another embodiment to yield a still further embodiment. Thus, it is intended that the invention cover such modifications and variations that come within the scope of the appended claims and their equivalents.

Figure 1:
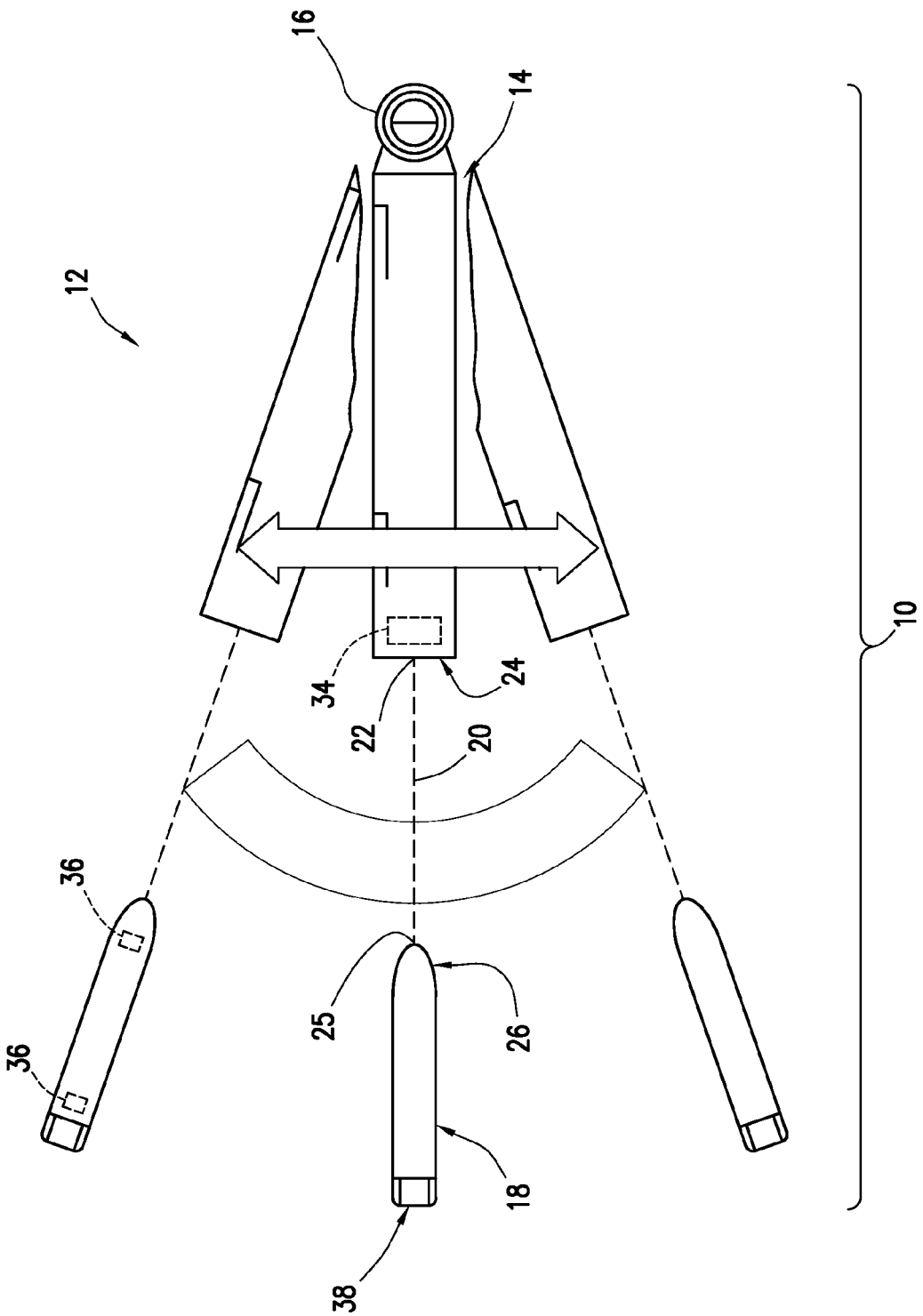
FIG. 1 is a schematic illustration of an a vessel positioning system for maintaining relative position between vessels according to a first embodiment.

Referring to FIG. 1, a vessel positioning system 10 is schematically illustrated according to a first embodiment. As will be understood from the description herein, the vessel positioning system 10 is employed in numerous contemplated embodiments to dynamically monitor and maintain relative position between two vessels during an operation that requires the vessels to be operatively coupled. The coupling may be required to carry out numerous operations. In one embodiment, a fluid, such as hydrocarbons (e.g., oil, gas, etc.) or fuel, for example, is transferred between the vessels. Irrespective of the precise operation being carried out, the vessel positioning system is configured to maintain various aspects of a relative position between the vessels. The relative position relates to distance between the vessels and or angular orientation of the vessels relative to one another, referred to herein as a "differential angle."

In the illustrated embodiment of FIG. 1, the vessel positioning system 10 is shown according to an embodiment comprising an offshore fluid storage and offload system 12. The system includes a storage tank vessel 14 that is specially equipped to function as an offshore hydrocarbon production facility. The storage tank vessel 14 may be a floating production, storage and offloading (FPSO) vessel or a floating liquefied natural gas (FLNG) vessel. Irrespective of the precise type of vessel, the storage tank vessel 14 is permanently moored, typically about a bow region 16 of the storage tank vessel 14, at the offshore site and connects to one or more subsea wells or a subsea production gathering system through one or more flow lines connected to a production inlet of the storage tank vessel 14. During production operations, produced hydrocarbons are received, directly or indirectly, from the subsea wells. Once on the storage tank vessel 14, hydrocarbons are processed and temporarily stored. Hydrocarbons stored on the storage tank vessel 14 are periodically transferred onto a shuttle tanker 18 temporarily positioned in the vicinity of the storage tank vessel 14 during the transfer of the hydrocarbons. The transfer of the hydrocarbons is conducted via an offload hose 20 having a first end 22 operatively coupled to a stern region 24 of the storage tank vessel 14 and a second end 25 operatively coupled to a bow region 26 of the shuttle tanker 18.

As shown, the storage tank vessel 14 and the shuttle tanker 18 are desired to be in an "in-line" arrangement to maintain safe and effective transfer of the hydrocarbons there between. Based on the fact that the storage tank vessel 14 and the shuttle tanker 18 are surface vessels, they are susceptible to varying degrees of weather conditions with various responding degrees of affect of those conditions. Maintaining alignment of the vessels is challenging in certain weather conditions. Specifically, wind and current have a significant effect on the angular position of the vessels. In one embodiment, the offshore fluid storage and offload system 12 has been particularly useful in environmental conditions where there is an average of at least about 15 knots of wind and/or at least about 1 knot of current or greater and with seas state of varying amounts and from differing directions. In such conditions, significant angular rotation of the storage tank vessel 14 about the axis of the bow region 16 is common. To avoid the need to decouple the vessels and halt offload operations during severe weather conditions, a control system 30 is integrated within the system 12.

The control system 30 is configured to receive data relating to maintaining a desired relative position between the vessels. Specifically, in the illustrated embodiment of the offshore fluid and offload system 12, the desired relative position is referred to as a "zero differential angle." A zero differential angle is defined as an alignment of the vessels where the entire length of the vessels is substantially co-axial, such that the angle of a longitudinal axis of each vessel is about zero. This may also be referred to as the vessels having a common heading.

Figure 2:
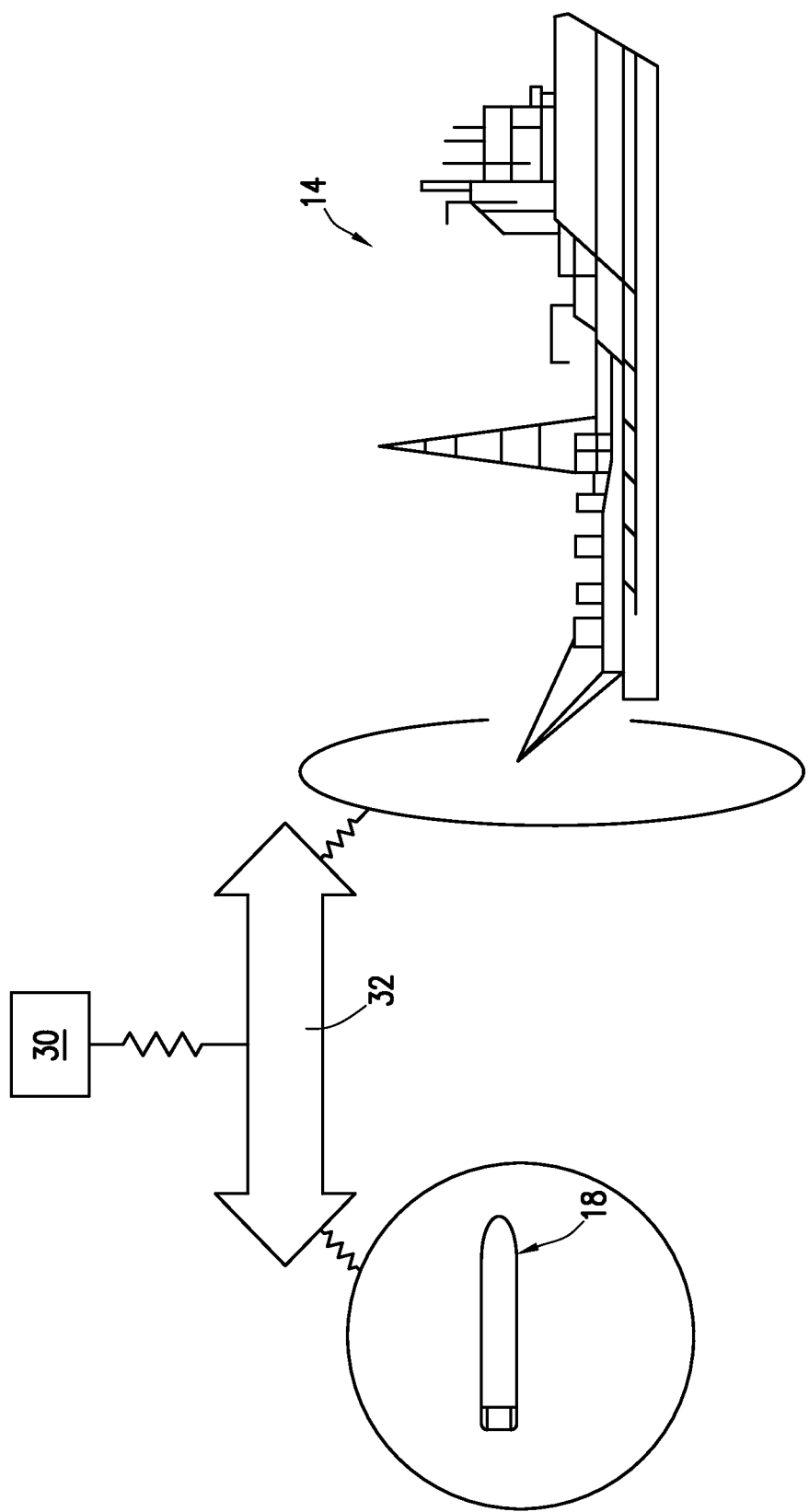
FIG. 2 is a schematic illustrating a radio frequency communication link between vessels and a control system integrated with the vessel positioning system of FIG. 1.

The data received by the control system 30 relates to environmental condition data comprising wind and water current information. Additionally, physical property data relating to numerous physical characteristics of the storage tank vessel 14 and the shuttle tanker 18 is input into the control system 30. The data on the physical characteristics may include weight, geometry and numerous other physical properties. Some of the data may be input into the control system 30 and fixed, while other data is received dynamically to account for continuously changing data, particularly data associated with the environmental conditions. In addition to the data described above, the control system 30 is continuously receiving input regarding the relative positions of the storage tank vessel 14 and the shuttle tanker 18. This may be at least partially facilitated by the inclusion of a radio frequency communication link 32 (FIG. 2) that provides signal communication between the storage tank vessel 14, the shuttle tanker 18 and the control system 30, which may be physically located on either vessel or both vessels. Alternatively, the control system 30 may be physically located in a remote location that is in operative communication with the storage tank vessel 14 and the shuttle tanker 18. The radio frequency communication link 32 comprises any system suitable for wireless communication between the vessels 14, 18 and the control system 30. Such systems include, but are not limited to, ultra-low frequency (ULF), low frequency (LF), high frequency (HF), very high frequency (VHF), ultra-high frequency (UHF), Wi-Fi, radar, microwave, laser and all legally and technically useful wavelengths in between.

As the control system 30 dynamically receives input relating to the differential angle of the vessels and the environmental condition data, the control system 30 compares the positional input to a desired relative position, specifically a zero differential angle. Once the control system 30 detects a difference between the actual input data and the desired relative position, at least one positioning action is initiated by the control system 30. Additionally, the control system 30 functions proactively to determine the likelihood that a zero differential angle will be disturbed based on the environmental condition data. Although the term zero differential angle is employed, it is to be understood that a predetermined range corresponding to a relatively minor angle may be programmed into the control system 30 to account for system margin of error, for example. Regardless of the acceptable predetermined range, all available data is processed by the control system 30 to determine the most efficient positioning action(s) to be carried out by the storage tank vessel 14 and the shuttle tanker 18 to maintain the zero differential angle.

The storage tank vessel 14 includes at least one, but typically a plurality of storage tank vessel thrusters 34 configured to modify a position of the storage tank vessel 14. Specifically, the storage tank vessel thrusters 34 are capable of modifying the heading of the storage tank vessel 14 by exerting a propulsion force on the vessel. In one embodiment, the plurality of storage tank vessel thrusters 34 are transversal propulsion devices built into, or mounted to, the bow region 16 and/or the stern region 24 of the storage tank vessel 14 to make the vessel more maneuverable. It is contemplated that thrusters may be included at any intermediate locations along the storage tank vessel 14 between the bow region 16 and the stern region 24 to provide additional maneuverability. Because the storage tank vessel 14 is fixed about the bow region 16, the thrusters employed to control the heading of the vessel are typically located proximate the stern region 24 and/or intermediate locations between the bow region 16 and the stern region 24. Irrespective of the precise location of the plurality of thrusters 34 that are employed to control the heading of the storage tank vessel 14, the combined power of the thrusters is sufficient to maneuver the vessel within a desired timeframe, but is proactive in that the DP-AS system is providing a future position and/or angle that is optimal for the offtake solution, which will vary depending upon the particular application and the environmental conditions that the vessel is operating in. In one embodiment, the combined thruster power employed to control the heading of the storage vessel 14 ranges from about 9 MW to about 20 MW. In other embodiments, the combined thruster power may range from about 1 MW to about 3 MW, from about 3 MW to about 9 MW, from about 20 MW to about 40 MW, from about 40 MW to about 60 MW, or from about 1 MW to about 100 MW.

Similar to the storage tank vessel 14, the shuttle tanker 18 includes at least one, but typically a plurality of shuttle tanker thrusters 36 configured to modify a position of the shuttle tanker 18. The shuttle tanker thrusters 36 are capable of modifying the heading of the shuttle tanker 18 by exerting a propulsion force on the vessel. The plurality of shuttle tanker thrusters 36 are transversal propulsion devices built into, or mounted to, the bow region 26 and/or a stern region 38 of the shuttle tanker 18 to make the vessel more maneuverable. It is contemplated that thrusters may be included at intermediate locations along the shuttle tanker 18 between the bow region 26 and the stern region 38 to provide additional maneuverability. The shuttle tanker 18 may or may not be fixed about the bow region 26, the stern region 38 or some intermediate location. As such, it is to be appreciated that the thrusters employed to control the heading of the shuttle tanker 18 may be located proximate the bow region 26, the stern region 38 and/or intermediate locations between the bow region 26 and the stern region 38. Irrespective of the precise location of the plurality of thrusters 36 that are employed to control the heading of the shuttle tanker 18, the combined power of the thrusters is sufficient to maneuver the vessel within a desired timeframe and in the desired direction and to the desired heading, which will vary depending upon the particular application and the environmental conditions that the vessel is operating in. In one embodiment, the combined power of the thrusters employed to control the heading is about 12 MW.

The control system 30 is in operative communication with the plurality of storage tank vessel thrusters 34 and the plurality of shuttle tanker thrusters 36. The operative communication is such that operation of both sets of thrusters can be initiated and controlled by the control system 30. As described in detail above, the control system 30 is configured to receive data and determine the most efficient positioning actions to be taken to maintain the zero differential angle in response to the processed data. Rather than simply controlling one of the two vessels in response to angular rotation of the other vessel, the control system 30 dynamically monitors the relative position and maintains a zero differential angle by controlling a combined positioning effort by the thrusters of both vessels.

In operation, the control system 30 processes received data and determines the positioning actions to be taken, if any. This analysis is performed continuously to dynamically monitor and maintain the zero differential angle described above. The plurality of storage tank vessel thrusters 34 and the plurality of shuttle tanker thrusters 36 may be operated at various powers to impart varying propulsion force magnitudes and may be manipulated to alter the propulsion force direction. The flexibility of both sets of thrusters facilitates a wide range of positioning actions, such that minor corrections may be made and more dramatic corrections may be made as the severity of the environmental conditions increases, as well as with regards to the internal capabilities of each vessels systems are performing.

Figure 3:
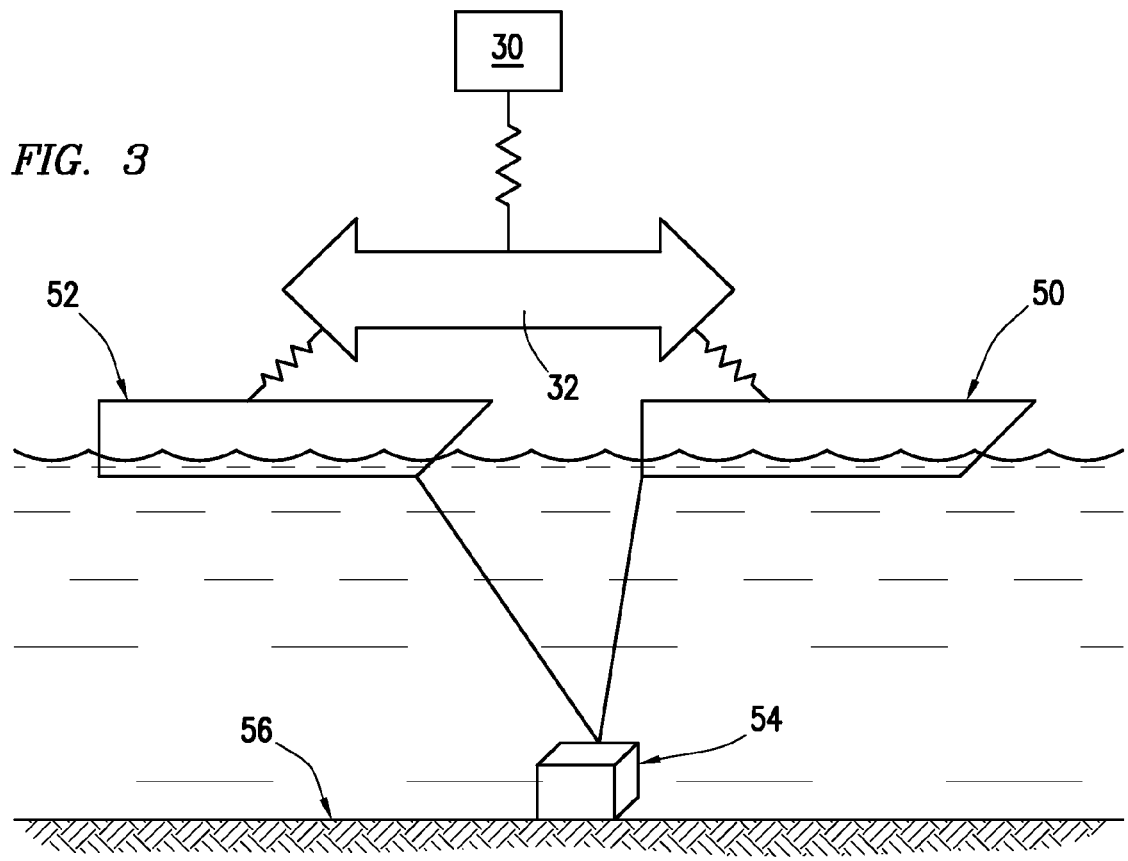
FIG. 3 is a schematic illustration of the vessel positioning system according to a second embodiment.
Figure 4:
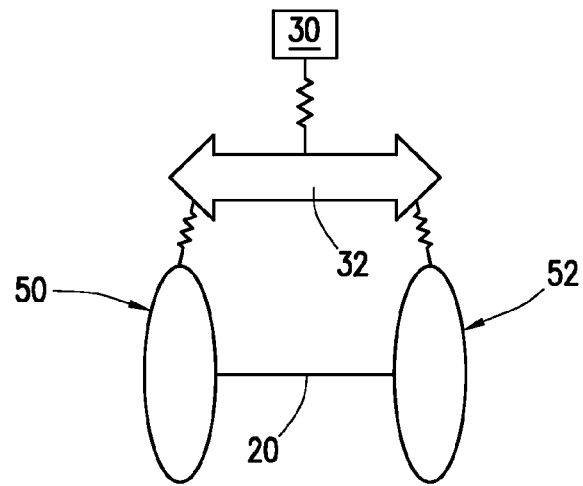
FIG. 4 is a schematic illustration of the vessel positioning system according to a third embodiment.

Referring now to FIGS. 3 and 4, although the embodiment of the vessel positioning system 10 is described in detail above in relation to the offshore fluid storage and offload system 12, it is to be appreciated that various other embodiments are contemplated. Generally, any operation that requires coupling of two vessels may benefit from the vessel positioning system 10.

In one embodiment (FIG. 3), a first vessel 50 and a second vessel 52 are indirectly coupled to each other via coupling of each vessel to a subsea lift 54 located on a sea floor 56. Various operations may be performed in such a configuration. Both the first vessel 50 and the second vessel 52 include at least one thruster, respectively, for maneuvering the vessels. Additionally, the control system 30 communicates and controls the thrusters to maintain a desired relative position of the vessels, which includes distance from each other and/or relative angular orientation. The components and operation of the vessel positioning system 10 have been described in detail above and is applicable to the illustrated embodiment.

The embodiment illustrated in FIG. 4 is similar in many respects to the embodiment described above in relation to FIGS. 1 and 2. The embodiment includes the first vessel 50 and the second vessel 52, which each may be any type of vessel. The first vessel 50 and the second vessel 52 are operatively coupled to perform an operation, but the vessels are arranged in a "side-by-side" arrangement, as shown, rather than the in-line arrangement of FIGS. 1 and 2. The first vessel 50 and the second vessel 52 are each equipped with thrusters, as described in detail above. The control system 30 is employed to maintain a desired relative position that includes distance and relative angular orientation. In one embodiment, the first vessel 50 and the second vessel 52 are moving forward at a propelled rate of speed while performing the operation that requires coupling. The vessel control system 10 facilitates the maintaining of a parallel alignment between the vessels and a distance that enables continued operation.

Figure 5:
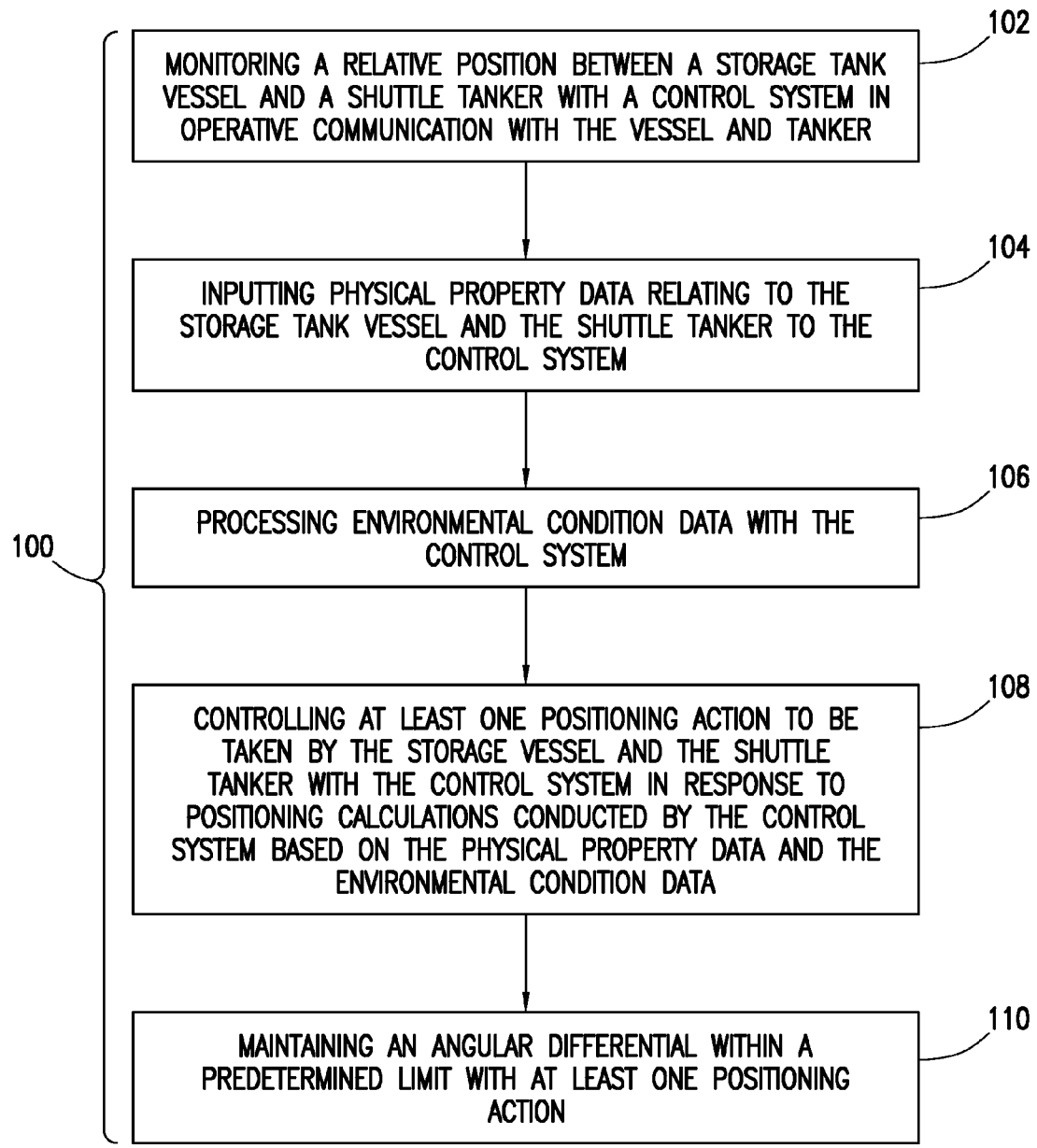
FIG. 5 is a flow diagram illustrating a method of maintaining positioning between vessels with the vessel positioning system.

According to one embodiment, a method of maintaining positioning between vessels 100 is provided, as illustrated in FIG. 5 and with reference to FIGS. 1-4. The vessel positioning system 10 and, more particularly, the offshore fluid storage and offload system 12 have been previously described and specific structural components need not be described in further detail. The method 100 includes monitoring 102 a relative position between the storage tank vessel 14 and the shuttle tanker 18 with the control system 30 that is in operative communication with the storage tank vessel 14 and the shuttle tanker 18. Physical property data relating to the storage tank vessel 14 and the shuttle tanker 18 is input 104 into the control system 30. The control system 30 processes 106 environmental condition data and controls 108 at least one positioning action to be taken by the storage tank vessel 14 and the shuttle tanker 18 in response to positioning calculations conducted by the control system 30 based on the physical property data and the environmental condition data. Using the collective data, the control system 30 facilitates maintaining 110 an angular differential within a predetermined limit with the positioning action(s).

Advantageously, the embodiments described above maintain a desired relative position of two vessels while performing an operation that requires coupling of the vessels. By controlling positioning actions that include operating thrusters of both vessels to facilitate a combined positioning effort to maintain the desired relative position, the likelihood of having to halt operations due to severe environmental conditions is reduced. The combined effort is a proactive approach enabled by control system dynamic monitoring of the relative position and the environmental data. This is an improvement over a reactive approach that simply controls one vessel in response to movement of the other vessel. As a result, the embodiments described herein improve safety, uptime and revenue.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of maintaining positioning between vessels comprising:
    monitoring a relative position between a storage tank vessel and a shuttle tanker with a control system in operative communication with the storage tank vessel and the shuttle tanker, wherein the control system controls thrusters of the storage tank vessel or the shuttle tanker or both and the storage tank vessel fixed about a storage tank vessel bow region and operatively coupled to the shuttle tanker with an offload hose extending from a storage tank vessel stern region to a shuttle tanker bow region;
    inputting physical property data relating to the storage tank vessel and the shuttle tanker to the control system;
    processing one or more environmental condition data related to wind or water with the control system;
    controlling at least one positioning action to be taken by the storage tank vessel and the shuttle tanker via the control system utilizing the thrusters of the storage tank vessel or the shuttle tanker or both based on the physical property data and the one or more environmental condition data; and
    maintaining an angular differential between the storage tank vessel and the shuttle tanker within a predetermined limit with the at least one positioning action.

2. The method of claim 1, wherein the at least one positioning action comprises controlling at least one storage tank vessel thruster and at least one shuttle tanker thruster with the storage tank vessel and the shuttle tanker, respectively.

3. The method of claim 2, wherein maintaining the angular differential comprises continuously monitoring respective headings of the storage tank vessel and the shuttle tanker.

4. The method of claim 3, wherein controlling the at least one storage tank vessel thruster modifies the heading of the storage tank vessel and controlling the at least one shuttle tanker thruster modifies the heading of the shuttle tanker.

5. The method of claim 2, wherein controlling the at least one storage tank vessel thruster and the at least one shuttle tanker thruster comprises operating the at least one storage tank vessel thruster at a power ranging from about 9 MW to about 20 MW and operating the at least one shuttle tanker thruster at a power of about 12 MW.

6. The method of claim 1, wherein the physical property data comprises weight and geometry of the storage tank vessel and the shuttle tanker.

7. The method of claim 1, wherein the environmental condition data comprises wind and current.

8. The method of claim 1, wherein the method is performed in environmental conditions comprising an average wind speed of greater than about 15 knots and an average current of about 1 knot.

9. The method of claim 1, wherein maintaining the angular differential within a predetermined limit comprises maintaining a zero differential angle between the storage tank vessel and the shuttle tanker.

10. The method of claim 1, wherein the control system is in operative communication with the storage tank vessel and the shuttle tanker with a radio frequency communication link configured to monitor the relative position.

\* \* \* \* \*